United States Patent
Pham et al.

(10) Patent No.: US 10,392,097 B2
(45) Date of Patent: Aug. 27, 2019

(54) EFFICIENT SUB-STRUCTURES

(71) Applicant: The Boeing Company, Chicago, IL (US)

(72) Inventors: Doan Dinh Pham, Lacey, WA (US); William Brent Harlow, Bothell, WA (US)

(73) Assignee: The Boeing Company, Chicago, IL (US)

( * ) Notice: Subject to any disclaimer, the term of this patent is extended or adjusted under 35 U.S.C. 154(b) by 176 days.

(21) Appl. No.: 15/434,565

(22) Filed: Feb. 16, 2017

(65) Prior Publication Data

US 2018/0229443 A1  Aug. 16, 2018

(51) Int. Cl.
*B64C 3/22* (2006.01)
*B33Y 10/00* (2015.01)
(Continued)

(52) U.S. Cl.
CPC ............ *B64C 3/22* (2013.01); *B21D 47/00* (2013.01); *B29C 64/10* (2017.08); *B29C 64/106* (2017.08); *B29C 70/023* (2013.01); *B29C 70/026* (2013.01); *B29C 70/443* (2013.01); *B29D 24/005* (2013.01); *B29D 99/0014* (2013.01); *B29D 99/0089* (2013.01); *B32B 3/12* (2013.01); *B33Y 10/00* (2014.12); *B33Y 80/00* (2014.12); *D06M 15/55* (2013.01); *B22F 3/1055* (2013.01); *B29C 70/086* (2013.01); *B29K 2063/00* (2013.01); *B29L 2031/3082* (2013.01); *B29L 2031/3085* (2013.01); *B29L 2031/60* (2013.01);
(Continued)

(58) Field of Classification Search
CPC ....... B21D 47/00; B22F 3/1055; B29C 64/10; B29C 64/106; B29C 70/023; B29C 70/026; B29C 70/086; B29C 70/443; B29D 24/005; B29D 99/0089; B29K 2063/00; B29K 2105/06; B29L 2031/3082; B29L 2031/3085; B29L 2031/60; B29L 2031/608; B32B 3/12; B33Y 10/00; B33Y 80/00; B64C 3/22; D06M 15/55; D06M 2101/40
See application file for complete search history.

(56) References Cited

U.S. PATENT DOCUMENTS 3,000,834 A   9/1961 Manuel
3,007,834 A   11/1961 Moeller et al.
(Continued)

FOREIGN PATENT DOCUMENTS

EP    0722825 A2    7/1996
WO    WO2015130377 A2    9/2015

OTHER PUBLICATIONS

Ajdari et al., Hierarchical honeycombs with tailorable properties, 2012, International Journal of Solids and Structures, 49, pp. 1412-1419. (Year: 2012).*

(Continued)

*Primary Examiner* — David Sample
*Assistant Examiner* — Elizabeth Collister
(74) *Attorney, Agent, or Firm* — Yee & Associates, P.C.

(57) ABSTRACT

A component, including a part, comprising a honeycomb-like structure formed from at least a seamless resin-infused fiber composite material. The honeycomb-like structure includes a first plurality of honeycomb-like cells, and a second plurality of honeycomb-like cells, different than the first plurality of honeycomb-like cells.

19 Claims, 5 Drawing Sheets

(51) Int. Cl.
*B33Y 80/00* (2015.01)
*D06M 15/55* (2006.01)
*B21D 47/00* (2006.01)
*B29C 70/44* (2006.01)
*B29D 24/00* (2006.01)
*B29D 99/00* (2010.01)
*B29C 70/02* (2006.01)
*B32B 3/12* (2006.01)
*B29C 64/10* (2017.01)
*B29C 64/106* (2017.01)
*D06M 101/40* (2006.01)
*B29K 63/00* (2006.01)
*B29L 31/60* (2006.01)
*B29L 31/30* (2006.01)
*B22F 3/105* (2006.01)
*B29C 70/08* (2006.01)

(52) U.S. Cl.
CPC .... *B29L 2031/608* (2013.01); *D06M 2101/40* (2013.01)

(56) References Cited

U.S. PATENT DOCUMENTS

| | | | |
|---|---|---|---|
| 5,437,936 A | | 8/1995 | Johnson |
| 5,785,919 A | * | 7/1998 | Wilson ................ B29D 24/005 264/401 |
| 2004/0048027 A1 | | 3/2004 | Hayes et al. |
| 2015/0239200 A1 | * | 8/2015 | Bartolome ............... B32B 3/12 428/118 |
| 2015/0266260 A1 | * | 9/2015 | Fujioka .................... B32B 3/30 428/118 |
| 2017/0348951 A1 | * | 12/2017 | Curfman ................ B32B 27/10 |

OTHER PUBLICATIONS

Partial European Search Report, dated Jul. 30, 2018, regarding Application No. EP17206550.0, 13 pages.

* cited by examiner

EFFICIENT SUB-STRUCTURES

BACKGROUND INFORMATION

1. Field

The present disclosure relates to efficient sub-structures. More particularly, the present disclosure relates to parts that have honeycomb-like structures that include different types of shaped openings within the structure. Still more particularly, the present disclosure relates to efficient sub-structures for flight control structures of aircraft.

2. Background

Building parts with a honeycomb-like internal structure has been known for decades for both buildings and vehicles such as aircraft. Honeycomb-like structures make components lighter and may convey greater strength, in some cases. Due to manufacturing limitations, honeycomb-like structures for any given part are uniform in nature. Thus, for example, all honeycombs within a given part have the same shape and size. The only way to vary honeycomb structures was to affix individual parts together, each made with a different honeycomb structure.

SUMMARY

An embodiment of the present disclosure provides for a component including a part comprising a honeycomb-like structure formed from at least a seamless resin-infused fiber composite material. The honeycomb-like structure includes a first plurality of honeycomb-like cells, and a second plurality of honeycomb-like cells, different from the first plurality of honeycomb-like cells.

Another embodiment of the present disclosure also provides for a method of manufacturing a part. The method includes using additive manufacturing to form seamlessly, a first honeycomb-like structure together with a second honeycomb-like structure. The first honeycomb-like structure and the second honeycomb-like structure are different.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
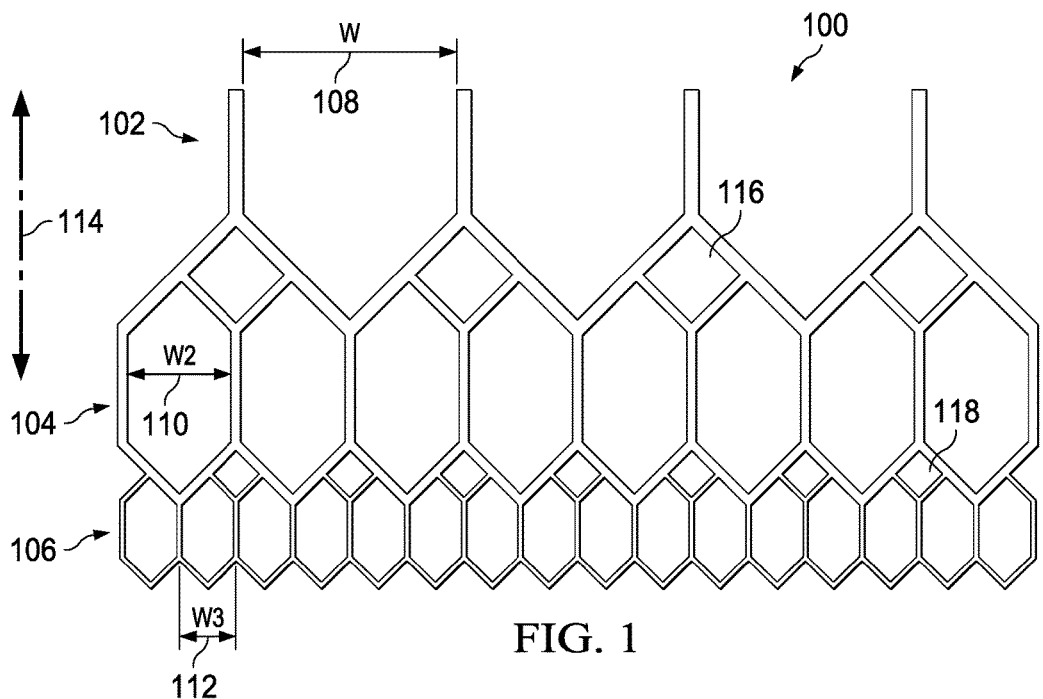
FIG. 1 is an illustration of a varying honeycomb-like structure depicted in accordance with an illustrative embodiment.

The illustrative embodiments recognize and take into account that new efficient sub-structures for construction and for vehicles, as well as flight control structures, can be made using additive manufacturing (AM). Additive manufacturing can efficiently create a structure with intricate designs that are tailored to a specific engineering application. For example, in the specific case of aircraft parts, ribs and spars can be built to meet specific load and stress conditions to replace conventional ribs or spars with a full depth honeycomb core design.

As used herein the term "structure" refers to an overall object which may be unitary or made from parts. The term "sub-structure" refers to a part which is included in or intended for use in a larger structure. Unless otherwise stated, a sub-structure is intended to be a unitary component which is not, itself, made from further sub-parts. The term "unitary" or "unitary construction" means that the object is created as a single contiguous thing and not assembled from parts or sub-parts.

The illustrative embodiments refer, in some cases, to aircraft parts, aircraft sub-structures, an aircraft as a structure, or parts used as part of operating an aircraft. However, such examples are illustrative only and do not necessarily limit the claimed inventions. The illustrative embodiments specifically contemplate structures and sub-structures used in other types of vehicles including but not limited to helicopters, automobiles, boats, ships, submarines, tanks. The illustrative embodiments also specifically contemplate other types of structures and sub-structures, such as those used in buildings or other objects. Thus, reference to an "aircraft" or part of an aircraft is only intended as a specific example of the illustrative embodiments without necessarily limiting the claimed inventions.

The illustrative embodiments also provide for a much more efficient design that can save weight, and be tailored to meet specific engineering requirements aside from load or stress requirements. For example, sub-structures can be made with a high temperature epoxy or with an aluminum alloy, or a combination of both materials. Aluminum web and high temperature plastic interfaces, such as feet, allow the sub-structure to be bonded to a carbon fiber skin without galvanic corrosion issues.

The illustrative embodiments recognize and take into account that current sub-structure designs, which in the specific example of vehicle parts could include spar, ribs, stringers, and other skin stiffeners, have design limitations and are undesirably heavy. The additive manufacturing techniques of the illustrative embodiments allow for a tailored design and more efficient load transfer while in use. The illustrative embodiments recognize and take into account that, using the techniques described herein, sub-structures can be designed to spread the load (like a leaf or web) and highly loaded areas can be reinforced by increasing the thickness of the web.

Lightening holes can also be provided in the sub-structures to save weight. For example, when web thickness is increased, sub-structure weight is also increased. Lightening holes can be placed in the sub-structures without compromising the stiffness of the sub-structure. Also, with lightening holes, when the sub-structure is bonded to the skin, usually in an autoclave or oven, the air inside the sub-structure is not trapped within one cell, but can move within the sub-structure. The ability for air to move helps stabilize the entire sub-structure. Additionally, this type of structure allows the introduction of additional pressure into the sub-structure to help prevent it from collapsing during curing.

Thus, the illustrative embodiments provide for a honeycomb-like structure having different size cells, different size walls, and different shaped cells. Portions of the cell wall can be thicker than others, where the thickness would provide a desired increase in strength. The increased thickness can correspond to the different cell sizes. A combination of materials may also be used, for example, a combination of epoxy and metal such as Aluminum. This structure can be used in both non-aerospace structures, as well as aerospace structures.

In a specific example, an exemplary cell structure could be applied to an aircraft wing. In this example, the outer walls are the thickest portion, the outer walls extending longitudinally. Moving inwardly from both walls, the largest cell structure evolves into smaller cell structures towards the middle of the cell structure. The wall thicknesses also change from thicker to thinner moving inwardly. The cell structure can be a mirror image about a centerline extending longitudinally.

Having regionally customized cells will allow for tailored strength and weight. The variable cell structure can also be applied to ailerons, spoilers, and flaps.

The thickness of the walls can vary also in a top to bottom fashion where in one example, the top and bottom of the honeycomb is thicker. This variation is particularly useful where the top and bottom are in contact with a covering or flat surface where the increased thickness provides a larger contact area for fastening or bonding.

Additionally, the material of the cell walls can vary. In one example, the thickened portion is made of high temperature epoxy, while the web is metal. To lighten the structure, holes of varying size may be located within the web.

Thus, the illustrative embodiments provide for a honeycomb-like structure having different cells types. The different cell type can include different sized cells. The different cell types can include different size walls. The different cell types can include different shaped cells. The different sized walls can vary in thickness from one sidewall towards an opposing sidewall. An outer cell wall portion may have the same height as an inner cell wall portion, but may be thicker at the outer cell wall portion. The different sized walls can vary, having increased thickness at either or both, the top or bottom portions. The structure may include lightening holes. The cells and cell walls may be formed from different materials.

The illustrative embodiments also recognize and take into account that current honeycomb-like structured objects cannot be varied. While different parts with different honeycomb-like shapes could be attached to each other, it is not possible to create a monolithic object having a honeycomb-like structure with varying cells. The illustrative embodiments also recognize and take into account that using a monolithic construction limits moisture up-take, which is a serious concern for honeycombed structures.

The illustrative embodiments also recognize and take into account that, when using 3D printing or additive manufacturing, the thickness of the wall can be changed as desired. The foot can be slightly thicker or flare out and the walls can be thicker to support more of a load. A wider foot gives more bonding surface to which the skin panel can be bonded. As the cell pitch and/or density is changed, the cell wall thickness can be changed. In a specific example, the cell wall can be 0.020 inches to 0.050 inches in thickness, as the pitch grows, to 1 inch apart or more, and the foot flares out to 0.100 inches wide. The cell pattern can change from hexagonal to any other desired shape.

FIG. 1 is an illustration of a varying honeycomb-like structure depicted in accordance with an illustrative embodiment. Honeycomb-like structure 100 is an example of a honeycomb-like structure that may be used when forming a component or sub-structure. Honeycomb-like structure 100 is a plurality of cells having a mixture of three different cell pitches. The pitch of a cell is defined by the width (W), across one cell. Honeycomb-like structure 100 has three groups of cells with three different pitches: first plurality of cells 102, second plurality of cells 104, and third plurality of cells 106. In this particular illustrative embodiment, each group of cells is adjacent the other along longitudinal axis 114 of honeycomb-like structure 100.

The first pitch of first plurality of cells 102 is width W 108. The second pitch of second plurality of cells 104 is width W2 110. The second pitch is smaller than the first pitch. The third pitch of third plurality of cells 106 is width W3 112. The third pitch is smaller than the second pitch. The thicknesses of the walls of each type of cell may vary. For example, the walls of first plurality of cells 102 may be thicker than the walls of second plurality of cells 104, which in turn may be thicker than the walls of third plurality of cells 106. However, this pattern may be varied. For example, the smaller cells may have the thickest walls, and many other variations are possible.

Because the pitches vary between groups of cells, interstitial spaces, such as interstitial space 116 and interstitial space 118, are formed between different groups of cell type. The interstitial spaces may be filled with a material, if desirable.

Honeycomb-like structure 100 may be manufactured using additive manufacturing techniques, such as, but not limited to, 3D printing. Additive manufacturing techniques allow the creation of unique structures without extensive machining. The materials used in additive manufacturing may provide for high temperature, high strength structures. Examples of such materials include epoxy, aluminum, and more importantly, combinations thereof within a single honeycomb-like structure.

Figure 2:
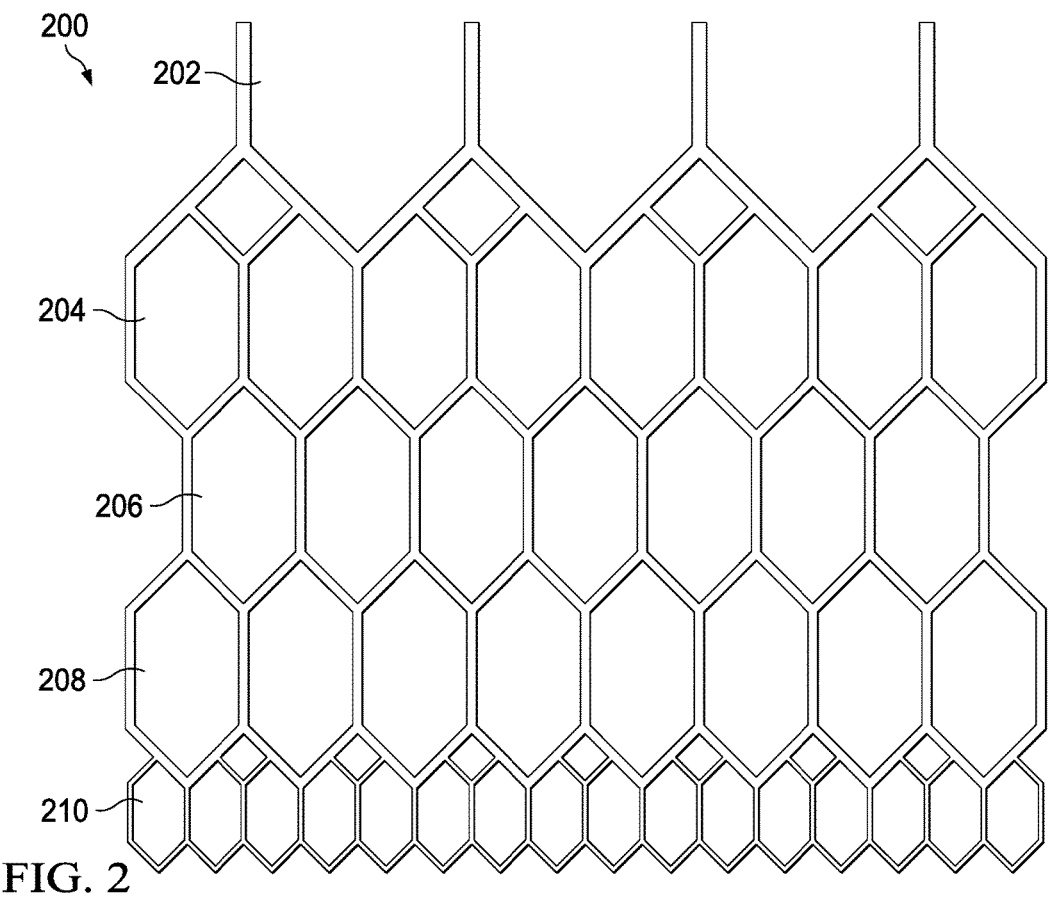
FIG. 2 is an illustration of another varying honeycomb-like structure depicted in accordance with an illustrative embodiment.

FIG. 2 is an illustration of another varying honeycomb-like structure depicted in accordance with an illustrative embodiment. Honeycomb-like structure 200 may be a variation of honeycomb-like structure 100 of FIG. 1. Honeycomb-like structure 200 may be a variable core, which includes multiple adjoining sets of the same type of honeycomb-like structure. Thus, for example, cell 202 may be of a first size; cell 204, cell 206, and cell 208 may all be of a second size; and cell 210 may be of a third size.

Honeycomb-like structure 200 may be suitable for small flight control surfaces, such as ailerons, spoilers, and flaps. Honeycomb-like structure 200 may be manufactured using additive manufacturing techniques. Honeycomb-like structure 200 may include a skin panel on one or both surfaces into and out of the page of FIG. 2. The skin panel may be a solid laminate and can be resin-infused and cured in an oven. Honeycomb-like structure 200 may be a monolithic structure created using additive manufacturing techniques, or may be bonded parts (such as bonding skin panels to a monolithically constructed honeycomb-like structure, such as honeycomb-like structure 200).

Figure 3:
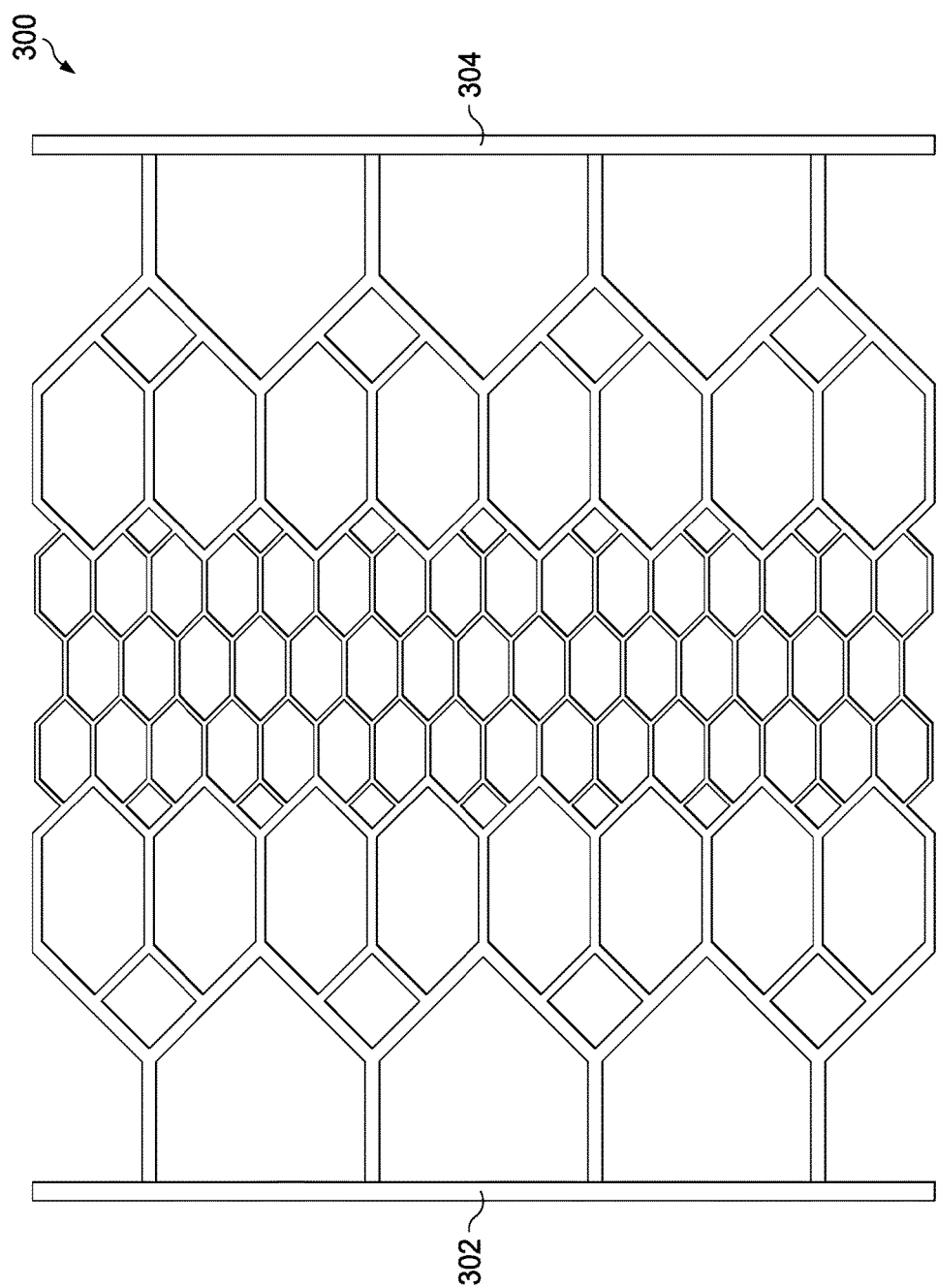
FIG. 3 is an illustration of yet another varying honeycomb-like structure depicted in accordance with an illustrative embodiment.

FIG. 3 is an illustration of yet another varying honeycomb-like structure depicted in accordance with an illustrative embodiment. Honeycomb-like structure 300 may be a side view of honeycomb-like structure 200 of FIG. 2, with skin panels attached. Thus, for example, the same cell structure shown in FIG. 2 is present in FIG. 3, but in FIG. 3 skin panel 302 and skin panel 304 are visible.

Figure 4:
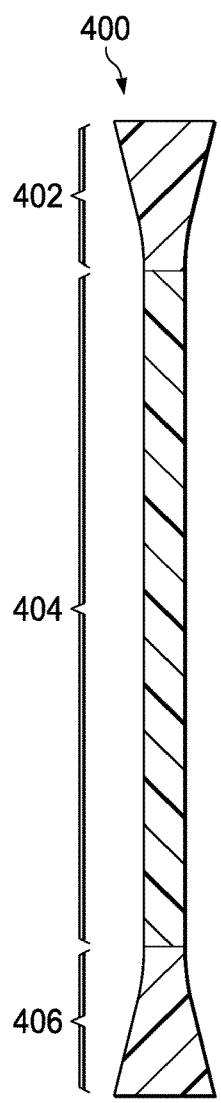
FIG. 4 is an illustration of varying wall thickness for walls of a honeycomb-like structure depicted in accordance with an illustrative embodiment.

FIG. 4 is an illustration of varying wall thicknesses for walls of a honeycomb-like structure depicted in accordance with an illustrative embodiment. Wall 400 may be the wall of a honeycomb cell in a honeycomb-like structure, such as honeycomb-like structure 100 of FIG. 1, honeycomb-like structure 200 of FIG. 2, or honeycomb-like structure 300 of FIG. 3.

Wall 400 includes three sections, including first section 402, second section 404, and third section 406. First section 402 and third section 406 may flare outwardly from second section 404 in order to provide additional bonding strength with respect to skin panels that may be bonded to the ends of first section 402 and third section 406. Second section 404 may be thinner in order to reduce the weight of the overall structure, while not sacrificing the overall strength of the structure. In other illustrative embodiments, second section 404 may have different shapes, such as, for example, a convex or concave shape.

Figure 5:
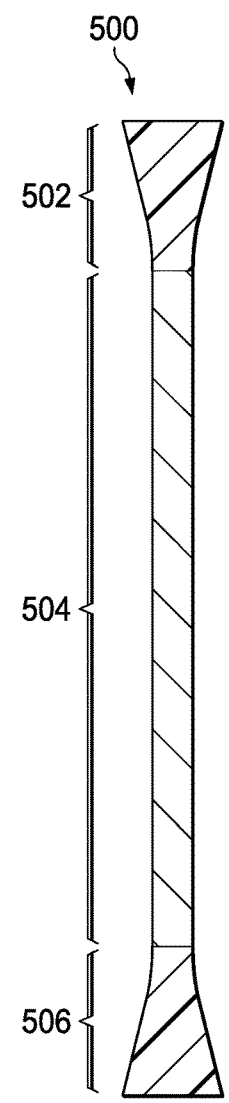
FIG. 5 is an illustration of varying wall thicknesses and wall materials for walls of a honeycomb-like structure depicted in accordance with an illustrative embodiment.

FIG. 5 is an illustration of varying wall thickness and wall material for walls of a honeycomb-like structure depicted in accordance with an illustrative embodiment. Wall 500 may be the wall of a honeycomb cell in a honeycomb-like structure, such as honeycomb-like structure 100 of FIG. 1, honeycomb-like structure 200 of FIG. 2, or honeycomb-like structure 300 of FIG. 3. Wall 500 may be a variation of wall 400 of FIG. 4.

Wall 500 includes three sections, including first section 502, second section 504, and third section 506. First section 502 and third section 506 may flare outwardly from second section 504 in order to provide additional bonding strength, with respect to the skin panels that may be bonded to the ends of first section 502 and third section 506. Second section 504 may be thinner in order to reduce the weight of the overall structure, while not sacrificing the overall strength of the structure. In other illustrative embodiments, second section 504 may have different shapes, such as, for example, a convex or concave shape.

One difference between wall 400 and wall 500 is that second section 504 of wall 500 may be formed from a different material than first section 502 and third section 506. For example, first section 502 and third section 506 may be formed from a high temperature epoxy or plastic in order to more easily bond wall 500 to a composite skin panel, such as a carbon fiber reinforced panel. However, second section 504 may be formed from a metal, such as but not limited to aluminum, in order to strengthen and/or lighten the overall honeycomb-like structure. In a particular example, aluminum may increase the stiffness of wall 500, thereby increasing the overall strength of a component formed using honeycombs having walls, such as wall 500.

Figure 6:
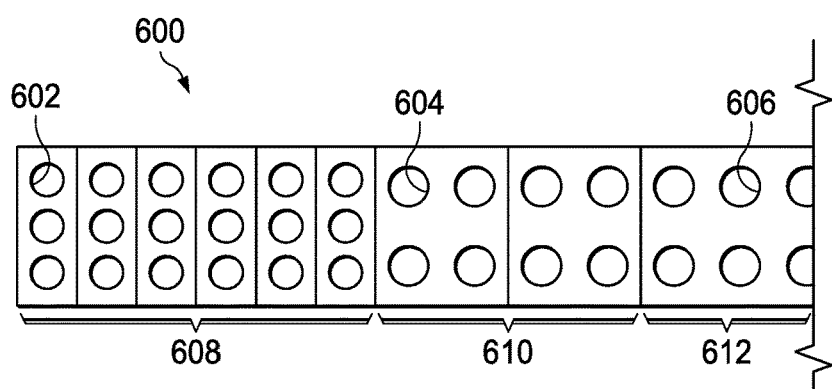
FIG. 6 is an illustration of lightening holes for a honeycomb-like structure depicted in accordance with an illustrative embodiment.

FIG. 6 is an illustration of lightening holes for a honeycomb-like structure, in accordance with an illustrative embodiment. Panel 600 may be, for example, a top view of a component, such as honeycomb-like structure 300 of FIG. 3. Lightening holes, such as hole 602, hole 604, and hole 606, may be included in panel 600.

Each of these holes may extend, completely or partially, through the component. For example, each of these holes may extend only through a skin panel, exposing the honeycomb-like structure underneath. In another example, the holes may correspond to spaces within the honeycomb-like structure. In still another example, the holes may effectively remove walls within the honeycomb-like structure, thereby extending all the way through the component in question. Many other variations are possible.

The density of holes, the size of holes, and the pattern of holes may vary over the surface of panel 600. Thus, for example, first group of holes 608 may be three holes of a first size arranged in a single row of three holes. Second group of holes 610 may be of a second size, larger than the first size, and arranged in groups of four in two rows of two. Third group of holes 612 may be of a third size, larger than the second size, and arranged in groups of six in two rows of three. Many other variations are possible from the example shown in FIG. 6.

Figure 7:
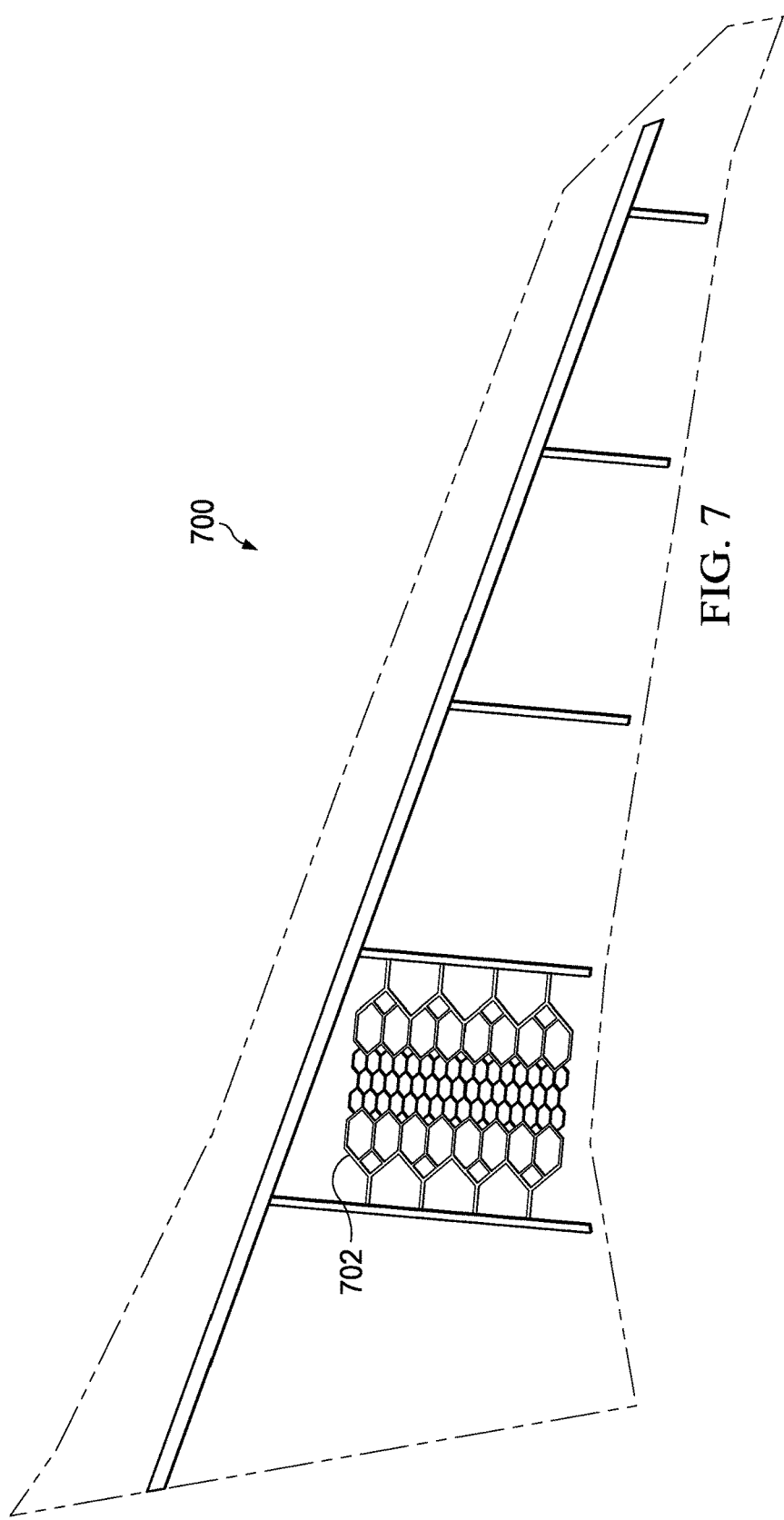
FIG. 7 is an illustration of an aircraft wing panel formed using a honeycomb-like structure depicted in accordance with an illustrative embodiment.

FIG. 7 is an illustration of an aircraft wing panel formed using a honeycomb-like structure depicted in accordance with an illustrative embodiment. Wing 700 is an example of a component that can be constructed using a honeycomb-like structure, such as honeycomb-like structure 100 of FIG. 1, honeycomb-like structure 200 of FIG. 2, or honeycomb-like structure 300 of FIG. 3. The walls of the honeycomb-like structure forming wing 700 may vary as described with respect to FIG. 4 or FIG. 5. Lightening holes, such as those shown in FIG. 6, optionally may be provided in wing 700.

Some or all of wing 700 may include a honeycomb-like structure, such as honeycomb-like structure 702. In this particular illustrative embodiment, honeycomb-like structure 702 is the same pattern as honeycomb-like structure 300 of FIG. 3, but other honeycomb-like structures are possible. The walls of each structure may vary, such as shown in FIG. 4 and FIG. 5.

Conventional wing structure or control surfaces (aileron, rudder, elevator, flap, spoiler, etc.) have spar and ribs as sub-structure. Skin panels are either stiffened with stringers or a honeycomb core. A full depth core is also used on some structures like the flap, spoiler and aileron, if it has weight advantage.

Thus, for large flight control surfaces, such as a rudder, an elevator, or the like, or for a small wing, the illustrative embodiments contemplate replacing a honeycomb core stiffened skin panel with a laminate skin panel. Likewise, honeycomb core stiffened ribs may be replaced with a variable rib and sub-structure created using additive manufacturing. The skin panel, in some instances, may be resin-infused, attached to the honeycomb-like structure, and then cured in an oven.

In smaller flight control surfaces, such as spoilers, flaps, ailerons, and the like, a full depth core may be used. Different core densities may be used in the same monolithic structure, or perhaps different structures spliced together, as desired to reinforce the part. Many other variations are possible.

Figure 8:
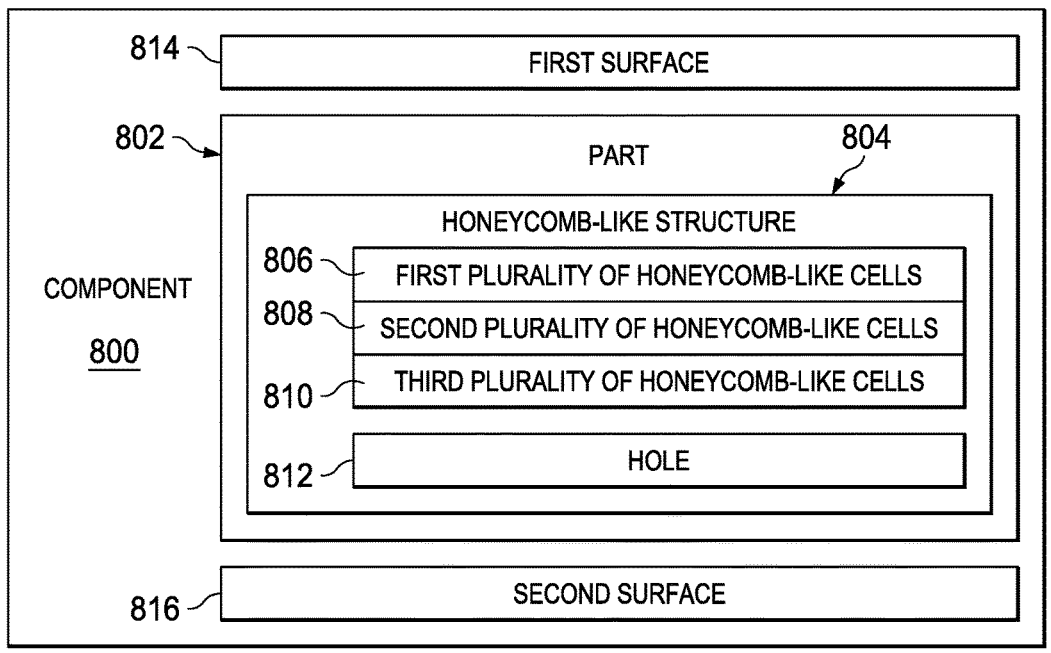
FIG. 8 is a block diagram of a component depicted in accordance with an illustrative embodiment.

FIG. 8 is a block diagram of a component depicted in accordance with an illustrative embodiment. Component 800 may be a variation of a sub-component with a honeycomb-like structure, as described above. For example, wing 700 with honeycomb-like structure 702 may be a specific example of component 800.

Component 800 may be part 802. Part 802 is distinguished from component 800, as part 802 may be a sub-part of component 800, but in other illustrative embodiments may be the entirety of component 800.

In any case, component 800 may be part 802 including honeycomb-like structure 804 formed from at least a seamless resin-infused fiber composite material. Honeycomb-like structure 804 includes first plurality of honeycomb-like cells 806. Honeycomb-like structure 804 also includes second plurality of honeycomb-like cells 808, different than first plurality of honeycomb-like cells 806. Optionally, honeycomb-like structure 804 may include third plurality of honeycomb-like cells 810, different from both first plurality of honeycomb-like cells 806 and second plurality of honeycomb-like cells 808.

Honeycomb-like structure 804 may be varied. For example, in an illustrative embodiment, first plurality of honeycomb-like cells 806 may be intermixed with second plurality of honeycomb-like cells 808 such that any given honeycomb-like cell of the first plurality is adjacent to at least one honeycomb-like cell of the second plurality. In another example, the first cells of first plurality of honeycomb-like cells 806 may be larger than the second cells of second plurality of honeycomb-like cells 808.

In still another illustrative embodiment, the first cells of first plurality of honeycomb-like cells 806 may have different wall thicknesses relative to the second cells of second plurality of honeycomb-like cells 808. In yet another illustrative embodiment, the first cells of first plurality of honeycomb-like cells 806 may have different shapes relative to the second cells of second plurality of honeycomb-like cells 808.

In still another illustrative embodiment, the first cells of first plurality of honeycomb-like cells 806 may have different wall thicknesses than the second cells of second plurality of honeycomb-like cells 808, and different sized walls may vary in thickness from one sidewall to an opposing sidewall. In this case, an outer cell wall portion may have a same height as an inner cell wall portion but is thicker at the outer cell wall portion.

In a different illustrative embodiment, the first cells of first plurality of honeycomb-like cells 806 may have walls that have different varying thicknesses at, either or both of, the top or bottom portions of the walls, relative to the second cells of second plurality of honeycomb-like cells 808. In yet a different illustrative embodiment, hole 812 may be disposed in honeycomb-like structure 804 where honeycomb-like structures are absent.

In still another illustrative embodiment, first plurality of honeycomb-like cells 806 may be made from a first material, and second plurality of honeycomb-like cells 808 may be made from a second material, different than the first material. In another variation, both first plurality of honeycomb-like cells 806 and second plurality of honeycomb-like cells 808 may be made from a first material along a first portion, and a second material along a second portion. In this case, the second material may be different than the first material. In still another variation, the second ones of second plurality of honeycomb-like cells 808 are disposed inside the first ones of first plurality of honeycomb-like cells 806.

Still other variations are possible. For example, component 800 may also include first surface 814 and second surface 816, opposite of first surface 814. In this case, honeycomb-like structure 804 is sandwiched between first surface 814 and second surface 816.

In a further variation, first surface 814 and second surface 816 may be made from a first material, wherein the honeycomb-like structure comprises at least a second material different than the first material. In this case, first surface 814 and second surface 816 may form a unitary construction with honeycomb-like structure 804. As a further variation, first plurality of honeycomb-like cells 806 may be made from the second material, and second plurality of honeycomb-like cells 808 may be made from a third material different than both the first material and the second material.

In yet another variation, the part may be an aircraft part. Still more particularly, the aircraft part may a wing made as a unitary piece. The aircraft part could also be a unitary fuselage, or a panel of multiple panels and components that make up a fuselage. The aircraft part could also be a spar, a stringer, or any other component used in an aircraft.

Many other variations are possible, as additive manufacturing can be used to make custom or unique honeycomb-like cell structures of varying cell types, cell wall thicknesses, differing materials, and other variations. Thus, the illustrative embodiments described above do not necessarily limit the claimed inventions or the other examples described herein.

Figure 9:
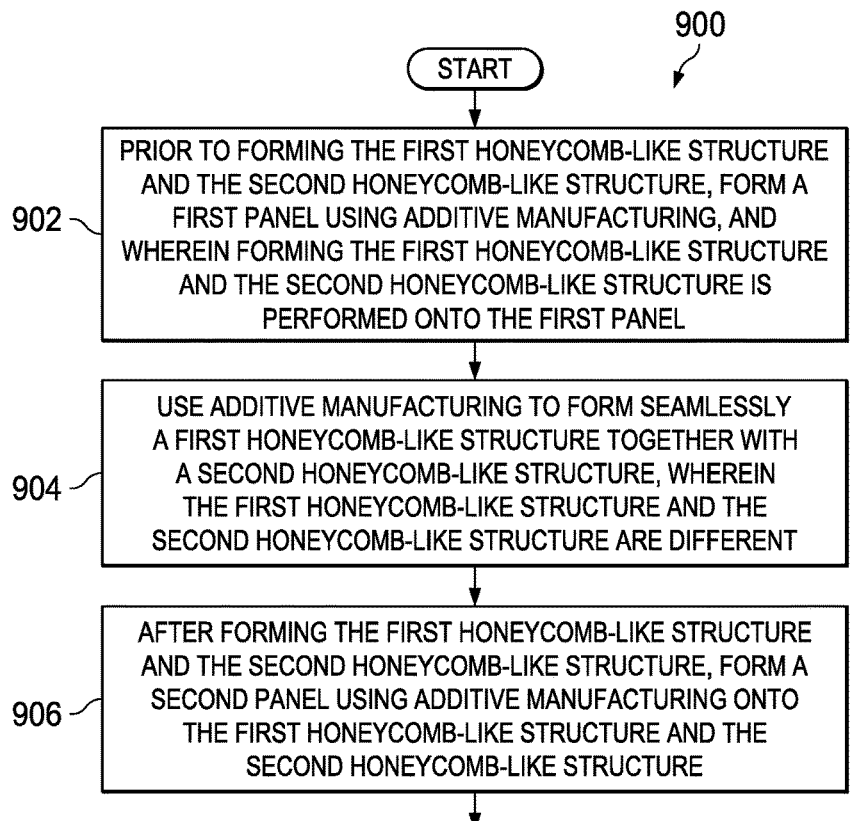
FIG. 9 is a flowchart of a method of manufacturing a component depicted in accordance with an illustrative embodiment.

FIG. 9 is a flowchart of a method of manufacturing a component depicted in accordance with an illustrative embodiment. Method 900 may be used to create the various structures described with respect to FIG. 1 through FIG. 8. Method 900 may be characterized as a method of manufacturing a part.

Method 900 may be broadly characterized as using additive manufacturing to form seamlessly, a first honeycomb-like structure together with a second honeycomb-like structure, wherein the first honeycomb-like structure and the second honeycomb-like structure are different (operation 904). Optionally, prior to forming the first honeycomb-like structure and the second honeycomb-like structure, forming a first panel using additive manufacturing, and wherein forming the first honeycomb-like structure and the second honeycomb-like structure is performed onto the first panel (operation 902). Optionally, after forming the first honeycomb-like structure and the second honeycomb-like structure, forming a second panel using additive manufacturing onto the first honeycomb-like structure and the second honeycomb-like structure (operation 906). Method 900 may be further varied. For example, the first walls of the first cells of the first honeycomb-like structure may have varying thicknesses and may be thinnest near the center points between the first panel and the second panel. In another example, the first honeycomb-like structure may be made from a first material. The second honeycomb-like structure may be made from a second material. The first material and the second material may be different. In a still different example, the first cells of the first honeycomb-like structure may be different in shape, relative to the second cells of the second honeycomb-like structure. The upper and lower skin of the airplane structure may be laid up separately, and then bonded to the honeycomb-like structure in an autoclave or oven. The skins may be pre-cured or may be un-cured when bonded to the honeycomb-like structure.

More or fewer operations may be added. For example, method 900 may be part of an aircraft manufacture or maintenance operation where parts are replaced or maintained. Thus, the illustrative embodiments described above do not necessarily limit the claimed inventions or other examples provided herein.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features, as compared to other illustrative embodiments. The embodiment or embodiments selected are chosen and described in order to best explain the principles of the embodiments, the practical application, and to enable others of ordinary skill in the art to understand the disclosure for various embodiments with various modifications, as are suited to the particular use contemplated.

What is claimed is:

1. A component comprising:
a part comprising a honeycomb-like structure attached to a first surface, the first surface formed from at least a seamless resin-infused fiber composite material, wherein the honeycomb-like structure comprises:
a first plurality of cells; and
a second plurality of cells, different than the first plurality of cells;
wherein first cells of the first plurality of cells have walls that have different varying thicknesses, at either or both of, a top or bottom portions of the walls, relative to second cells of the second plurality of cells.

2. The component of claim 1 further comprising:
a third plurality of cells, different from both the first plurality of cells and the second plurality of cells.

3. The component of claim 1, wherein the first plurality of cells is intermixed with the second plurality of cells such that any given cell of the first plurality of cells is adjacent to at least one cell of the second plurality of cells.

4. The component of claim 1, wherein the first cells of the first plurality of cells are larger than the second cells of the second plurality of cells.

5. The component of claim 1, wherein the first cells of the first plurality of cells have different shapes relative to the second cells of the second plurality of cells.

6. The component of claim 1, wherein the walls are different sized walls that vary in thickness from one sidewall to an opposing sidewall, and wherein an outer cell wall portion has a same height as an inner cell wall portion but is thicker at the outer cell wall portion.

7. The component of claim 1 further comprising:
a hole disposed in the honeycomb-like structure where honeycombs are absent.

8. The component of claim 1, wherein the first plurality of cells comprises a first material, and wherein the second plurality of cells comprises a second material different than the first material.

9. The component of claim 1, wherein both the first plurality of cells and the second plurality of cells comprise a first material along a first portion and a second material along a second portion, and wherein the second material is different than the first material.

10. The component of claim 1, wherein second ones of the second plurality of cells are disposed inside first ones of the first plurality of cells.

11. The component of claim 1 further comprising:
a second surface opposite the first surface, wherein the honeycomb-like structure is sandwiched between the first surface and the second surface.

12. The component of claim 11, wherein the first surface and the second surface comprise a first material, wherein the honeycomb-like structure comprises at least a second material different than the first material, and wherein the first surface and the second surface form a unitary construction with the honeycomb-like structure.

13. The component of claim 12, wherein the first plurality of cells comprises the second material, and wherein the second plurality of cells comprises a third material different than both the first material and the second material.

14. The component of claim 1, wherein the part comprises an aircraft part.

15. The component of claim 14, wherein the aircraft part comprises a wing made as a unitary piece.

16. A method of manufacturing a part comprising a honeycomb-like structure attached to a first panel, the first panel formed from at least a seamless resin-infused fiber composite material, the method comprising:
forming a first honeycomb-like structure together with a second honeycomb-like structure, wherein the first honeycomb-like structure has first cells and the second honeycomb-like structure has second cells, wherein the first cells have walls that have different varying thicknesses, at either or both of, a top or bottom portions of the walls, relative to the second cells.

17. The method of claim 16 further comprising:
prior to forming the first honeycomb-like structure and the second honeycomb-like structure, forming the first panel, and wherein forming the first honeycomb-like structure and the second honeycomb-like structure is performed onto the first panel; and
after forming the first honeycomb-like structure and the second honeycomb-like structure, forming a second panel onto the first honeycomb-like structure and the second honeycomb-like structure.

18. The method of claim 17, wherein:
the part comprises an aircraft part;
first walls of the first cells of the first honeycomb-like structure have the varying thicknesses and are thinnest near center points between the first panel and the second panel;
the first honeycomb-like structure comprises a first material, wherein the second honeycomb-like structure comprises a second material, the first material and the second material being different; and
the first cells of the first honeycomb-like structure are different in shape relative to the second cells of the second honeycomb-like structure.

19. A component comprising:
a part comprising a honeycomb-like structure attached to a first surface, the first surface formed from at least a seamless resin-infused fiber composite material, wherein the honeycomb-like structure comprises:
a first plurality of cells; and
a second plurality of cells, different than the first plurality of cells;
wherein both the first plurality of cells and the second plurality of cells comprise a first material along a first portion and a second material along a second portion, and wherein the second material is different than the first material.

* * * * *